United States Patent
Ishii et al.

(10) Patent No.: US 6,748,173 B2
(45) Date of Patent: Jun. 8, 2004

(54) OPTICAL TRANSMISSION SYSTEM AND OPTICAL TRANSMISSION APPARATUS USED THEREFOR

(75) Inventors: Yoshikazu Ishii, Yokohama (JP); Susumu Kirii, Tokyo (JP); Hideto Takahashi, Chigasaki (JP); Kuniharu Itakura, Yokohama (JP); Shinshi Kuno, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 579 days.

(21) Appl. No.: 09/757,254

(22) Filed: Jan. 9, 2001

(65) Prior Publication Data

US 2001/0008451 A1 Jul. 19, 2001

(30) Foreign Application Priority Data

Jan. 12, 2000 (JP) ...................................... P2000-003174

(51) Int. Cl.[7] ................................................. H04J 14/02
(52) U.S. Cl. .............................. 398/79; 398/76; 398/81; 398/141; 398/147; 398/159; 398/194; 398/187; 398/192; 370/295; 385/140
(58) Field of Search ...................... 398/76, 7.9, 94, 398/141, 159, 185–187, 192, 194, 197, 200, 214, 81, 147; 370/295; 385/140

(56) References Cited

U.S. PATENT DOCUMENTS

| | | | | | |
|---|---|---|---|---|---|
| 4,722,081 | A | * | 1/1988 | Fujito et al. | 398/76 |
| 4,893,300 | A | * | 1/1990 | Carlin et al. | 398/76 |
| 5,432,632 | A | * | 7/1995 | Watanabe | 398/76 |
| 5,896,216 | A | | 4/1999 | Kikushima et al. | 359/182 |
| 6,271,942 | B1 | * | 8/2001 | Sasai et al. | 398/9 |

FOREIGN PATENT DOCUMENTS

JP  8-274714  10/1996

* cited by examiner

*Primary Examiner*—Kinfe-Michael Negash
(74) *Attorney, Agent, or Firm*—Pearne & Gordon LLP (57) ABSTRACT

Optical transmission being performed by frequency modulating frequency-division-multiplexed multi-channel signals as a single unit, distortion that is caused by a ripple-shaped group delay deviation in a transmitter 2, a receiver 4 and an optical link 3 is reduced by providing a level adjuster 2a for adjusting the level of frequency-division-multiplexed multi-channel signals input to the FM modulator 2b, and by increasing the input level of multi-channel signals to the FM modulator 2b by level adjusting means 2a to enlarge the bandwidth of FM signal, in the case where the number of channels is small.

10 Claims, 10 Drawing Sheets

OPTICAL TRANSMISSION SYSTEM AND OPTICAL TRANSMISSION APPARATUS USED THEREFOR

BACKGROUND OF THE INVENTION

1. Field of the Invention

The present invention relates to an optical transmission system for frequency modulating frequency-division-multiplexed multiplexed-channel signals as a single unit for optical transmission and optical transmission apparatus used for the system.

2. Description of the Related Art

Figure 10:
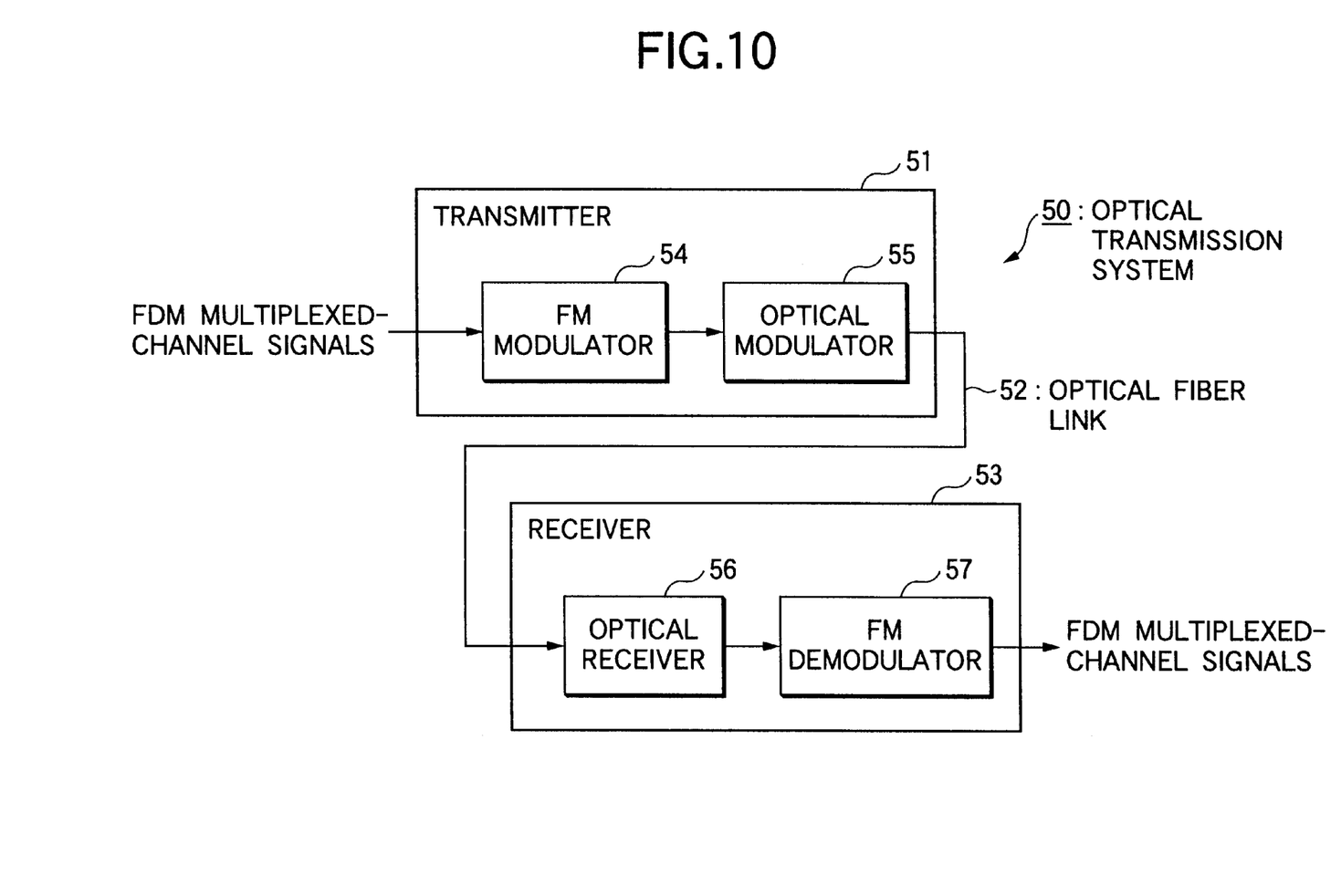
FIG. 10 is a block diagram showing the configuration of a conventional optical transmission system.

Conventionally, there is known a system for frequency modulating frequency-division-multiplexed multiplexed-channel signals as a single unit for transmission. FIG. 10 is a block diagram showing the configuration of such a conventional optical transmission system. In FIG. 10, an optical transmission system 50 has a configuration in which a transmitter 51 connects to a receiver 53 through an optical transmission link, such as an optical fiber 52.

The transmitter 51 is composed of a general FM modulator 54 for frequency modulating a carrier signal as a single unit by frequency-division-multiplexed multiplexed-channel signals and an optical modulator 55 for modulating the intensity state of a signal light by the resulting frequency-modulated signals. The receiver 53 is composed of an optical receiver for performing photoelectric conversion of transmitted optical signals and an FM demodulator 57 for frequency demodulating the frequency-modulated signal to output frequency-division-multiplexed multiplexed-channel signals.

Next, the operation of a conventional optical transmission system is described below. Frequency-division-multiplexed multiplexed-channel signals input to the FM modulator 54 are frequency modulated as a single unit. The resulting frequency-modulated signal is applied to the optical modulator, which changes the intensity state of the signal light, and is transmitted through the optical fiber line 52. Optical signal transmitted to the receiver 53 undergo photoelectric conversion, and the resulting frequency-modulated signals is frequency demodulated by the FM demodulator 57 to restore frequency-division-multiplexed multiplexed-channel signals.

An optical transmitter used for this type of optical transmission systems is disclosed, for example, in JP-A-8-274714 (optical signal transmitter). This optical signal transmitter can transmit multiplexed-channel signals (video signals) by converting amplitude modulated broadband electrical signals to frequency-modulated electrical signals, and thus can provide an optical transmitter having good signal quality.

Figure 3:
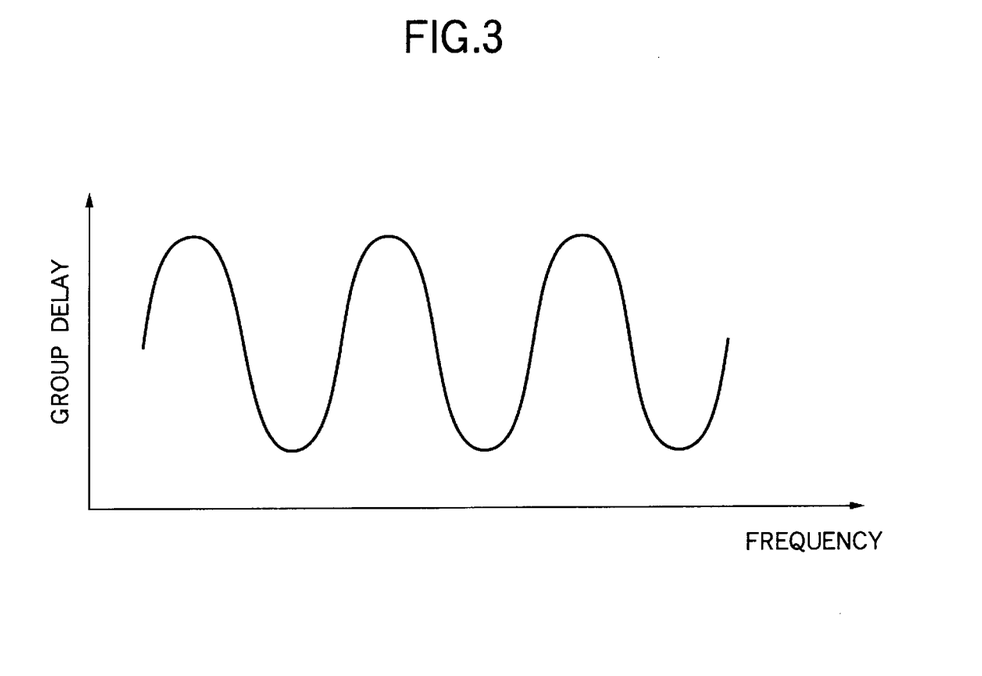
FIG. 3 is a schematic diagram of ripple-shaped group delay deviation.

However, in this type of conventional optical transmission system and an optical transmitter used for the optical transmission system, there occurs a ripple-shaped group delay deviation which periodically varies from the specific frequency shown in FIG. 3. This group delay deviation raises the problems such that the number of channels for frequency-division-multiplexed multiplexed-channel signals input to the transmitter becomes small, that is to say, bandwidth of FM signal frequency modulated as a single unit is reduced so that distortion caused by the ripple-shaped group delay deviation comes to be larger distortion in case of the signals being transmitted from the transmitter to the receiver.

SUMMARY OF THE INVENTION

The object of the invention is to provide an optical transmission system for increasing the level per waveform of multiplexed-channel signals and increasing the bandwidth of FM signal to reduce the distortion caused by a ripple-shaped group delay deviation in a transmitter, a receiver and optical transmission link, even in the case where the number of channels for frequency-division-multiplexed (FDM) multiplexed-channel signal input to the transmitter is small, and the bandwidth of FM signal frequency modulated as a single unit is reduced.

An optical transmission system according to the invention comprises a transmitter for transmitting optical signals based on the input frequency-division-multiplexed multiplexed-channel signals and a receiver for receiving optical signals transmitted from the transmitter through optical transmission link, the transmitter having signal level adjusting means for reducing the distortion caused by a ripple-shaped group delay deviation in a transmitter a receiver and the optical transmission link in transmitting optical signals from a transmitter or a receiver. Through such a system configuration, the bandwidth of FM signal can be enlarged and the distortion caused by a ripple-shaped group delay deviation in a transmitter, a receiver and optical transmission link can be reduced by adjusting to increase the level per waveform of multiplexed-channel signals through signal level adjusting means, even in the case where the number of channels for the frequency-division-multiplexed multiplexed-channel signals input to the transmitter is small, and the bandwidth of FM signal frequency modulated as a single unit is reduced.

In an optical transmission system according to the invention, the transmitter is equipped with a general FM modulator for frequency modulating multiplexed-channel signals as a single unit and the receiver is equipped with optical modulation means for adjusting the intensity state of the signal light through frequency modulated signals obtained by frequency modulating multiplexed-channel signals as a single unit. Further equipped is an optical receiver for performing photoelectric conversion of the optical signal transmitted to the receiver through the optical transmission link on a general FM demodulation for frequency demodulating FM signal obtained thereby. Through such a system configuration, the bandwidth of FM signal can be enlarged and the distortion caused by a ripple-shaped group delay deviation in a transmitter, a receiver and optical transmission link can be reduced by increasing the level per waveform of multiplexed-channel signals through signal level adjusting means when signals are transmitted from the transmitter to the receiver through an optical channel, even in the case where the number of channels for frequency-division-multiplexed multiplexed-channel signals input to the transmitter is small, and the bandwidth of FM signal frequency modulated as a single unit is reduced.

In an optical transmission system according to the invention, the signal level adjusting means is equipped with an amplifier for amplifying multiplexed-channel signals and an attenuator for attenuating while adjusting the output of the amplifier. Through such a system configuration, the bandwidth of FM signal can be enlarged and the distortion caused by a ripple-shaped group delay deviation in a transmitter, a receiver and optical transmission link can be reduced by increasing the level per waveform of multiplexed-channel signals based on the output of the amplifier when FDM multiplexed-channel signals are transmitted from the transmitter to the receiver through an optical link, even in the case where the number of channels for frequency-division-multiplexed multiplexed-channel signals input to the transmitter is small, and the bandwidth of FM signal frequency modulated as a single unit is reduced.

In an optical transmission system according to the invention, the signal level adjusting means is used to manually adjust the input level of the FDM multiplexed-channel signals based on the number of channels for the FDM multiplexed-channel signals. Through such a system configuration, the bandwidth of FM signal can be enlarged and the distortion caused by a ripple-shaped group delay deviation of a transmitter, a receiver and optical transmission link can be reduced by manually adjusting the level in waveform of FDM multiplexed-channel signals when they are transmitted from the transmitter to the receiver through the optical link, even in the case where the number of channels for frequency-division-multiplexed multiplexed-channel signals input to the transmitter is small, and the bandwidth of FM signal frequency modulated as a single unit is reduced.

In an optical transmission system according to the invention, the transmitter comprises a bandwidth detector for detecting the bandwidth of the FM signal. Through such a system configuration, the bandwidth of FM signal can be enlarged and the distortion caused by a ripple-shaped group delay deviation of signals transmitted from a transmitter, a receiver and optical transmission link can be reduced by detecting the bandwidth of FM signal whose input level is adjusted to enlarge the bandwidth of the FM signal when signals are transmitted from the transmitter to the receiver through an optical channel, even in the case where the number of channels for frequency-division-multiplexed multiplexed-channel signals input to the transmitter is small, and the bandwidth of FM signal frequency modulated as a single unit is reduced.

An optical transmitter according to the invention comprises a transmitter for transmitting optical signals based on the input frequency-division-multiplexed multiplexed-channel signals, the transmitter comprising signal level adjusting means for reducing the distortion caused by a ripple-shaped group delay deviation in the transmitter, the receiver and the optical transmission link in transmitting optical signals from the transmitter to the receiver, and for adjusting the level of transmit signals depending on the increase/decrease in the number of channels for FDM multiplexed-channel signals to keep constant of the bandwidth of the FM signal. Through such a system configuration, the bandwidth of FM signal can be enlarged and the distortion caused by a ripple-shaped group delay deviation of signals transmitted from a transmitter to a receiver can be reduced to transmit the multiplexed-channel signals with good signal quality, by adjusting to increase the level per waveform of multiplexed-channel signals through signal level adjusting means, even in the case where the number of channels for frequency-division-multiplexed multiplexed-channel signals input to the transmitter is small, and the bandwidth of FM signal frequency modulated as a single unit is reduced.

In an optical transmitter according to the invention, the transmitter is equipped with a general FM modulator for frequency modulating the multiplexed-channel signals as a single unit. Through such a system configuration, the bandwidth of FM signal can be enlarged and the distortion caused by a ripple-shaped group delay deviation of signals transmitted from a transmitter to a receiver can be reduced to transmit multiplexed-channel signals with good signal quality, by increasing the level per waveform of multiplexed-channel signals when signals are transmitted from the transmitter to the receiver through an optical channel, even in the case where the number of channels for frequency-division-multiplexed multiplexed-channel signals input to the transmitter is small, and the bandwidth of FM signal frequency modulated as a single unit is reduced.

In an optical transmitter according to the invention, the signal level adjusting means is equipped with an amplifier for amplifying the multiplexed-channel signals and an attenuator for attenuating while adjusting the output of the amplifier. Through such a system configuration, the bandwidth of FM signal can be enlarged and the distortion caused by a ripple-shaped group delay deviation of signals transmitted from a transmitter to a receiver can be reduced by increasing the level per waveform of multiplexed-channel signals based on the output of the amplifier when signals are transmitted from the transmitter to the receiver through an optical channel, even in the case where the number of channels for frequency-division-multiplexed multiplexed-channel signals input to the transmitter is small, and the bandwidth of FM signal frequency modulated as a single unit is reduced.

In an optical transmitter according to the invention, the signal level adjusting means is used to manually adjust the input level of multiplexed-channel signals based on the number of channels for the multiplexed-channel signals. Through such a system configuration, the bandwidth of the FM signal can be enlarged and the distortion caused by a ripple-shaped group delay deviation of signals transmitted from a transmitter to a receiver can be reduced by manually adjusting the level per waveform of FDM multiplexed-channel signals when they are transmitted from the transmitter to the receiver through an optical transmission link, even in the case where the number of channels for frequency-division-multiplexed FDM multiplexed-channel signals input to the transmitter is small, and the bandwidth of FM signal frequency modulated as a single unit is reduced.

In an optical transmitter according to the invention, the transmitter comprises a bandwidth detector for detecting the bandwidth of FM signal. Through such a system configuration, the bandwidth of FM signal can be enlarged and the distortion caused by a ripple-shaped group delay deviation in a transmitter, a receiver and the optical transmission link can be reduced by detecting the bandwidth of FM signal whose input level is adjusted to enlarge the bandwidth of the FM signal when FDM signals are transmitted from the transmitter to the receiver through an optical transmission link, even in the case where the number of channels for frequency-division-multiplexed multiplexed-channel signals input to the transmitter is small, and the bandwidth of FM signal frequency modulated as a single unit is reduced.

DESCRIPTION OF THE PREFERRED EMBODIMENTS

Embodiments of the invention are described below with reference to drawings.

Figure 1:
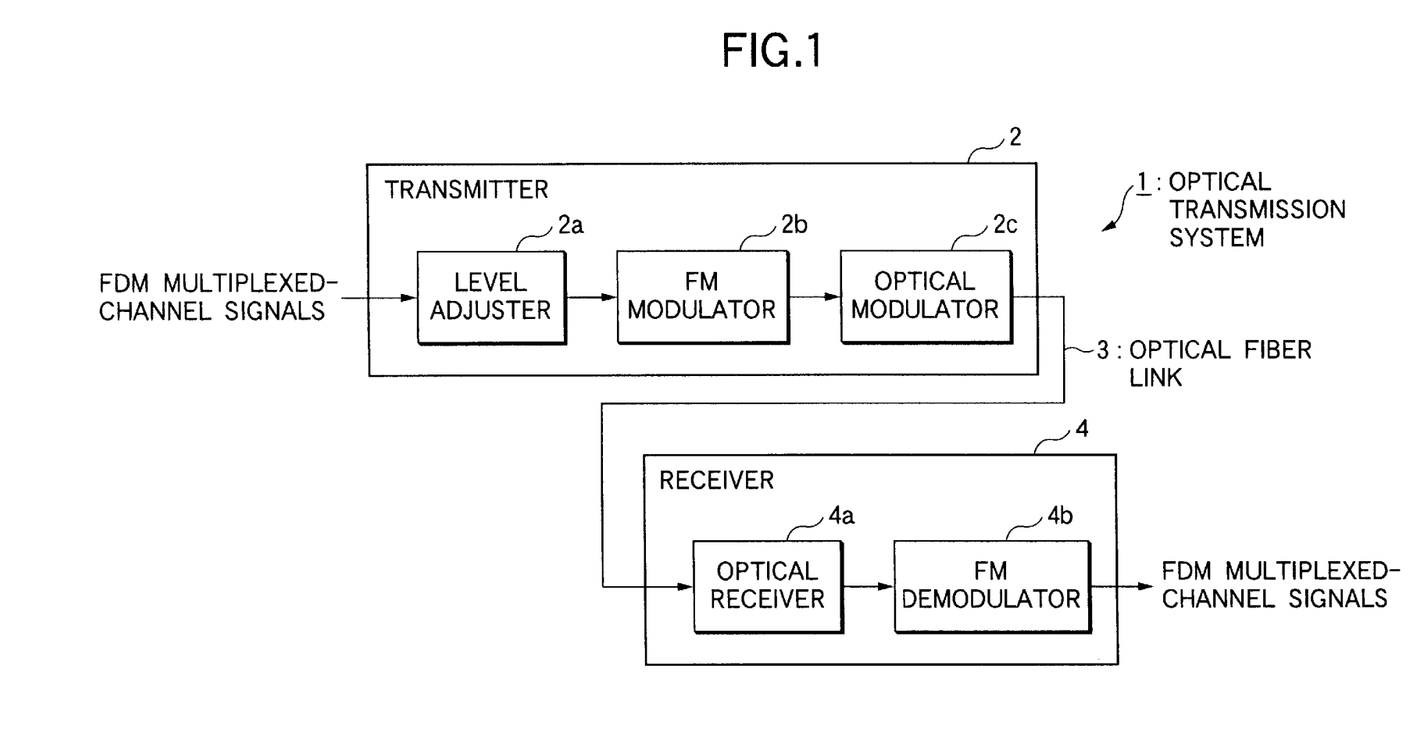
FIG. 1 is a block diagram showing the configuration according to the first embodiment 1.

FIG. 1 is a block diagram showing the configuration according to the first embodiment 1. In FIG. 1, an optical transmission system 1 has a configuration in which a transmitter 2 connects to a receiver 4 through an optical fiber 3 as an optical transmission link. The transmitter 2 transmits optical signals based on the input frequency-division-multiplexed (FDM) multiplexed-channel signals (hereafter FDM multiplexed-channel signals). The receiver 4 receives optical signals transmitted from the transmitter 2 through the optical fiber 3.

The transmitter 2 is composed of a level adjuster (signal level adjusting means) $2a$, an FM modulator $2b$ and an optical modulator $2c$. The level adjuster $2a$ adjusts the level of transmit signals depending on the increase/decrease in the number of channels for FDM multiplexed-channel signals to keep constant the frequency band, and reduces the distortion caused by ripple-shaped group delay deviation which occurs in the transmitter, the receiver and the optical fiber 3. The FM modulator $2b$ frequency modulates the level-adjusted FDM multiplexed-channel signals as a single unit. The optical modulator $2c$ adjusts the intensity state of a signal light, or intensity modulates the signal light, by using the FM frequency-modulated signal.

The receiver 4 is composed of an optical receiver $4a$ and an FM demodulator $4b$. The optical receiver performs photoelectric conversion of transmitted optical signals to obtain FM signals frequency modulated as a single unit. The FM demodulator frequency demodulates the resulting FM signals frequency modulated as a single unit to reproduce FDM multiplexed-channel signals.

Next, the operation in the in the optical transmission system 1 is described below. FDM multiplexed-channel signals input to the transmitter 2 are adjusted in terms of the input level to the FM modulator $2b$. These level-adjusted FDM multiplexed-channel signals are frequency modulated as a single unit by the FM modulator $2b$. The resulting FM signal frequency modulated as a single unit is applied to the optical modulator 2, and the signal light is intensity modulated for optical transmission through the optical fiber link 3. Optical signals transmitted to the receiver 4 undergo photoelectric conversion through the optical receiver $4a$, and the resulting FM signal frequency modulated as a single unit is obtained. The FM signal frequency modulated as a single unit obtained is frequency demodulated by the FM demodulator $4b$ to restore FDM multiplexed-channel signals.

As mentioned earlier, according to an embodiment of the invention, the distortion caused by a ripple-shaped group delay deviation on the FM signal channel in the transmitter 2 and receiver 4 can be reduced by increasing the signal level per waveform of FDM multiplexed-channel signals and by keeping constant the bandwidth of FM signal through the level adjuster $2a$, even in the case where the number of channels for FDM multiplexed-channel signals input to the transmitter 2 is small, and the bandwidth of the FM signal frequency modulated as a single unit is reduced.

Figure 2:
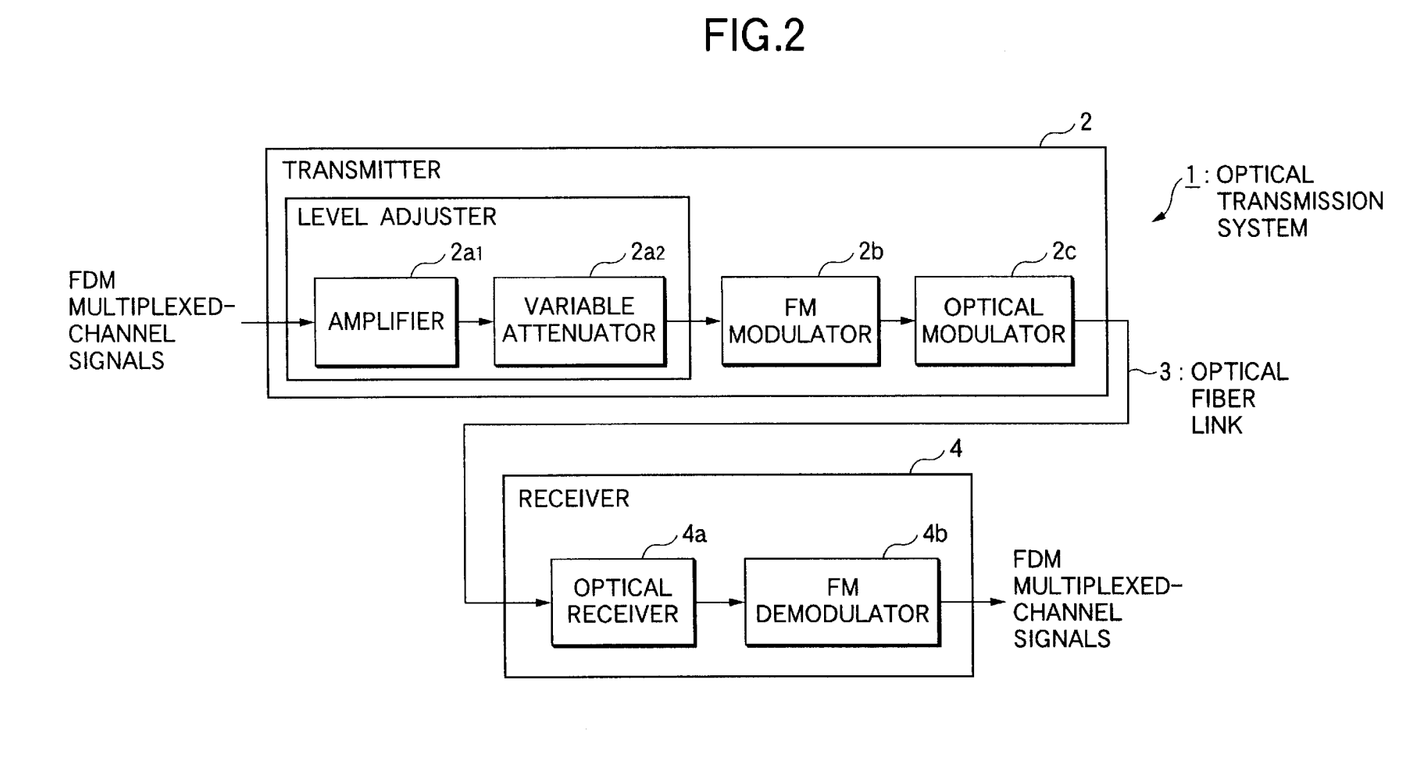
FIG. 2 is a block diagram showing the configuration according to a variation example of embodiment 1.

FIG. 2 is a block diagram showing a variation example of embodiment 1. Same signs are used for the same configuration as that of embodiment 1, and corresponding details are omitted.

This variation is composed of an amplifier $2a_1$ and a variable attenuator $2a_2$ as an example of level adjuster $2a$. The amplifier $2a_1$ amplifies FDM multiplexed-channel signals input to the transmitter 2. The variable attenuator $2a_2$ attenuates while adjusting the amplified output of the amplifier $2a_1$.

FDM multiplexed-channel signals input to the receiver 4 can be easily adjusted in terms of the input level to the FM modulator $2b$, by manually adjusting the signal level in the variable attenuator $2a_2$ through the level adjuster $2a$.

As mentioned earlier, the signal input level per waveform of FDM multiplexed-channel signals can be adjusted manually when FDM multiplexed-channel signals are transmitted from the transmitter 2 to the receiver 4 through the optical fiber 3, even in the case where the number of channels for FDM multiplexed-channel signals input to the transmitter 2 is small, and the bandwidth of FM signal frequency modulated as a single unit is reduced. Accordingly, it is possible to enlarge the bandwidth of FM signal and reduce the distortion caused by a ripple-shaped group delay deviation of the transmitter 2, the receiver 4 and the optical fiber 3.

Next, additional explanation is made for adjusting the level of FDM multiplexed-channel signals to reduce the distortion through the level adjuster 1. For example, in a system which use the FM modulator $2b$, distortion can be classified into nonlinear distortion caused by non-linearity of the FM modulator $2b$ and the FM demodulator $4b$, and group delay distortion linear distortion) caused by group delay deviation of the transmitter 2, the receiver 4 and the optical fiber 3. The group delay deviation is caused by inter-device reflection on the FM signal channel in the transmitter 2 and the receiver 4. Accordingly, as shown in the characteristic diagram of FIG. 3, ripple-shaped group delay deviation is often dominant in which group delay along the vertical axis periodically varies against the frequency along the horizontal axis.

Figure 4:
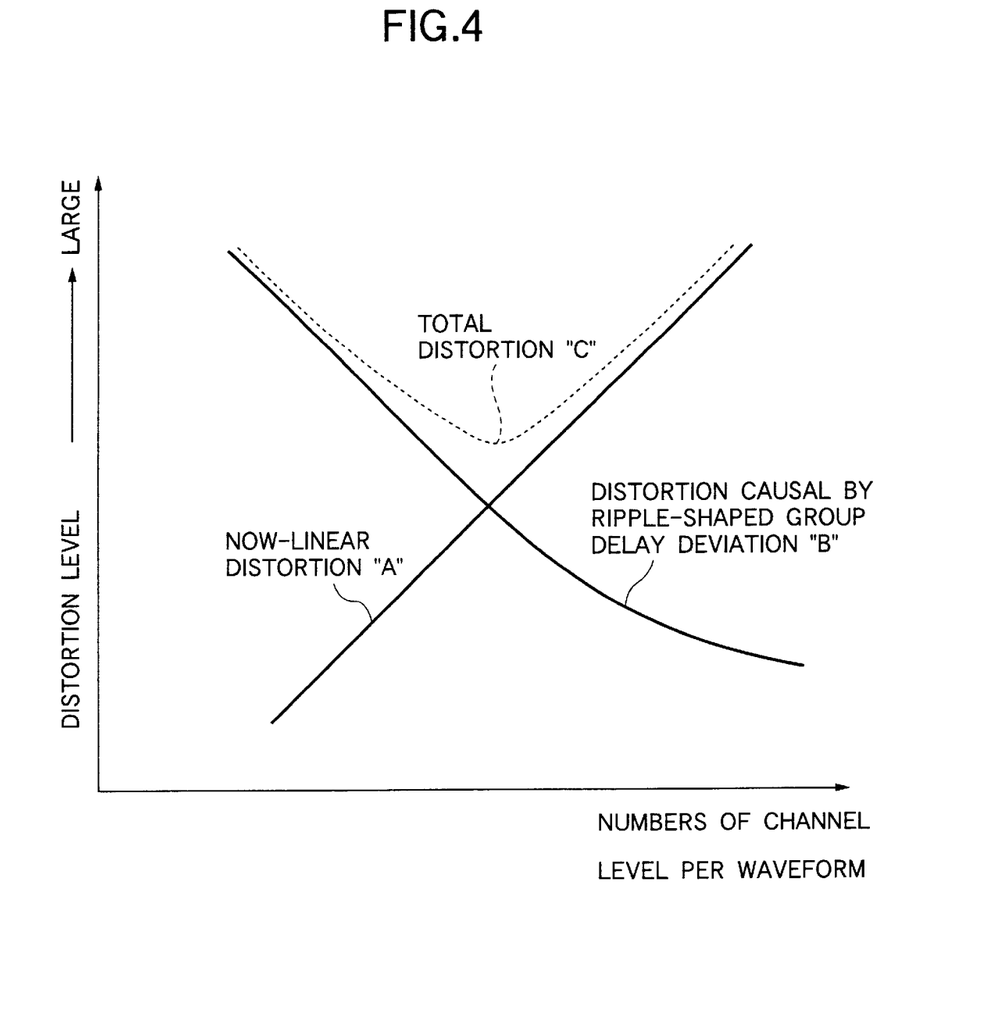
FIG. 4 is exemplary characteristics showing the relationship between nonlinear distortion, distortion caused by ripple-shaped group delay deviation, and signal level number of channels.

When such a deviation occurs, nonlinear distortion A and distortion caused by ripple-shaped group delay deviation are obtained as a distortion level on the vertical axis, against the number of channels on the horizontal axis of illustration of FIG. 4. Total distortion C is obtained from these distortions. Distortion B caused by ripple-shaped group delay deviation is larger in the case of smaller number of channels or lower level per waveform and a smaller bandwidth after frequency modulation. In the case where the number of channels for FDM multiplexed-channel signals input to the transmitter 2 is small, the bandwidth of the FM signal is enlarged by increasing the level per waveform. Distortion A is large in the case of larger number of channels or high level per waveform. By optimizing the signal level per waveform so that the total distortion C resulting from nonlinear distortion A and group delay distortion B may be minimized, distortion after transmission can be reduced or suppressed.

Figure 5:
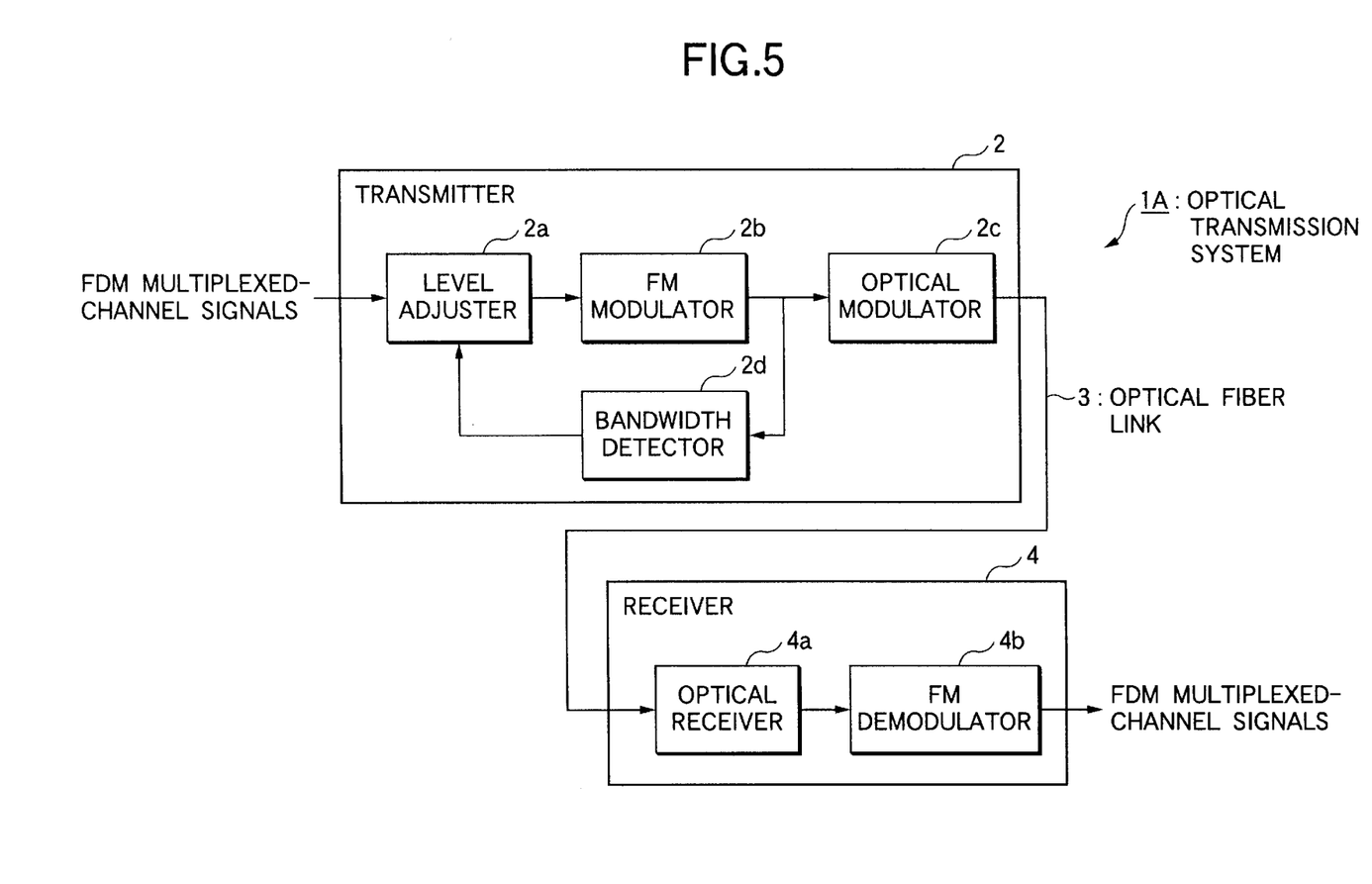
FIG. 5 is a block diagram showing the configuration of embodiment 2 according to the invention.

FIG. 5 is a block diagram showing the configuration of embodiment 2 according to the invention. Same signs are used for the same configuration as that of embodiment 1, and corresponding details are omitted. An optical transmission system 1A in embodiment 2 is of a configuration in which the level of FDM multiplexed-channel signals is automatically adjusted by detecting the bandwidth of FM signal through a bandwidth detector 2d to keep constant the bandwidth of FM signal.

The bandwidth detector 2d is used to detect the bandwidth of FM signal. Through such a system configuration, the bandwidth of FM signal can be detected for adjusting the signal input level per waveform of FDM multiplexed-channel signals to enlarge the bandwidth of FM signal when FDM multiplexed-channel signals are transmitted from the transmitter 2 to the receiver 4 through an optical fiber 3, even in the case where the number of channels of FDM multiplexed-channel signals input to the transmitter 2 is small, and the bandwidth of FM signal frequency modulated as a single unit is reduced. Accordingly, it is possible to reduce the distortion caused by a ripple-shaped group delay deviation of the transmitter 2, the receiver 4 and the optical fiber 3.

Figure 6:
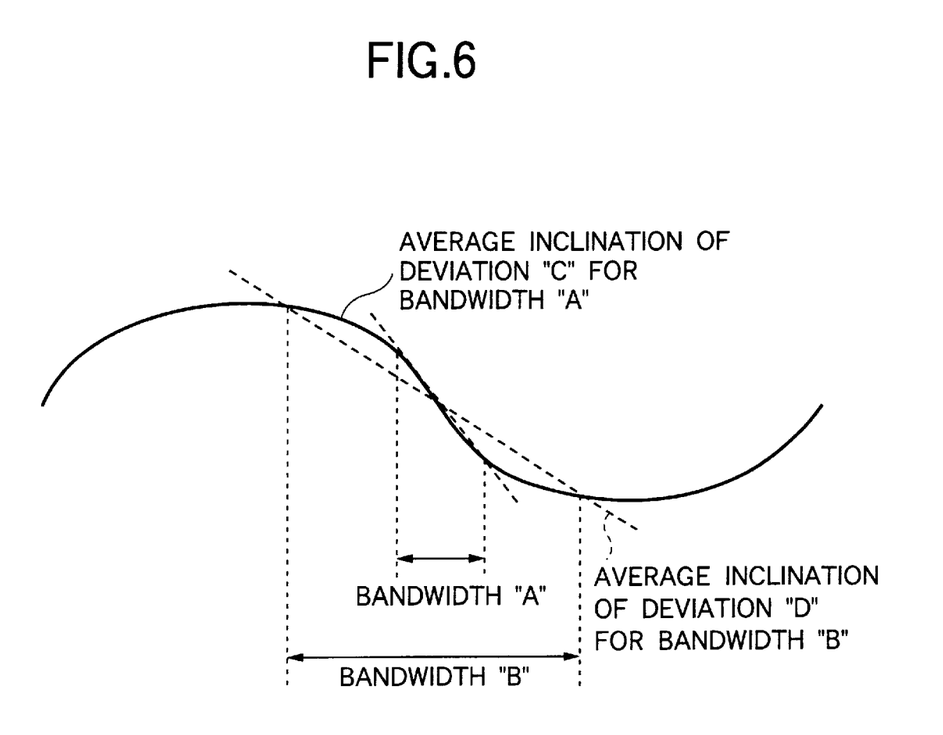
FIG. 6 is a characteristic diagram showing the inclination of deviation between the FM signal bandwidth and ripple-shaped group delay deviation.

Next, operation of the optical transmission system 1A is detailed based on FIG. 6. As shown in FIG. 6, the distortion caused by ripple-shaped group delay deviation is kept substantially constant by keeping constant the bandwidth of FM signal, because the bandwidths of FM signals A, B correspond to the inclination of group delay deviation C, D which relate to the magnitude of distortion. FDM multiplexed-channel signals input to the transmitter 2 are automatically adjusted in terms of the input level to the FM modulator 2b, so that the bandwidths of FM signals A, B can be kept constant through the level adjuster 2a based on control signals from the bandwidth detector 2d. Level-adjusted FDM multiplexed-channel signals are frequency modulated as a single unit by the FM modulator 2b. The resulting FM signal frequency modulated as a single unit are applied to the optical modulator 2c, and the signal light is intensity modulated for optical transmission through the optical fiber 3. Optical signals transmitted to the receiver 4 undergo photoelectric conversion by the optical receiver 4a, and the resulting FM signal frequency modulated as a single unit is frequency demodulated by the FM demodulator 4b to restore FDM multiplexed-channel signals.

As mentioned earlier, according to embodiment 2 of the invention, the distortion caused by a ripple-shaped group delay deviation on the FM signal channel in the transmitter 2 and receiver 4 can be reduced and kept substantially constant by detecting the bandwidth of FM signal through the bandwidth detector 2d and automatically increasing the signal level per waveform of FDM multiplexed-channel signals and by keeping constant the bandwidth of FM signal through the level adjuster 2a, even in the case where the number of channels of FDM multiplexed-channel signals input to the transmitter 2 is small, and the bandwidth of the FM signal frequency modulated as a single unit is reduced, or in the case where the number of transmission channels has changed after system implementation.

Figure 7:
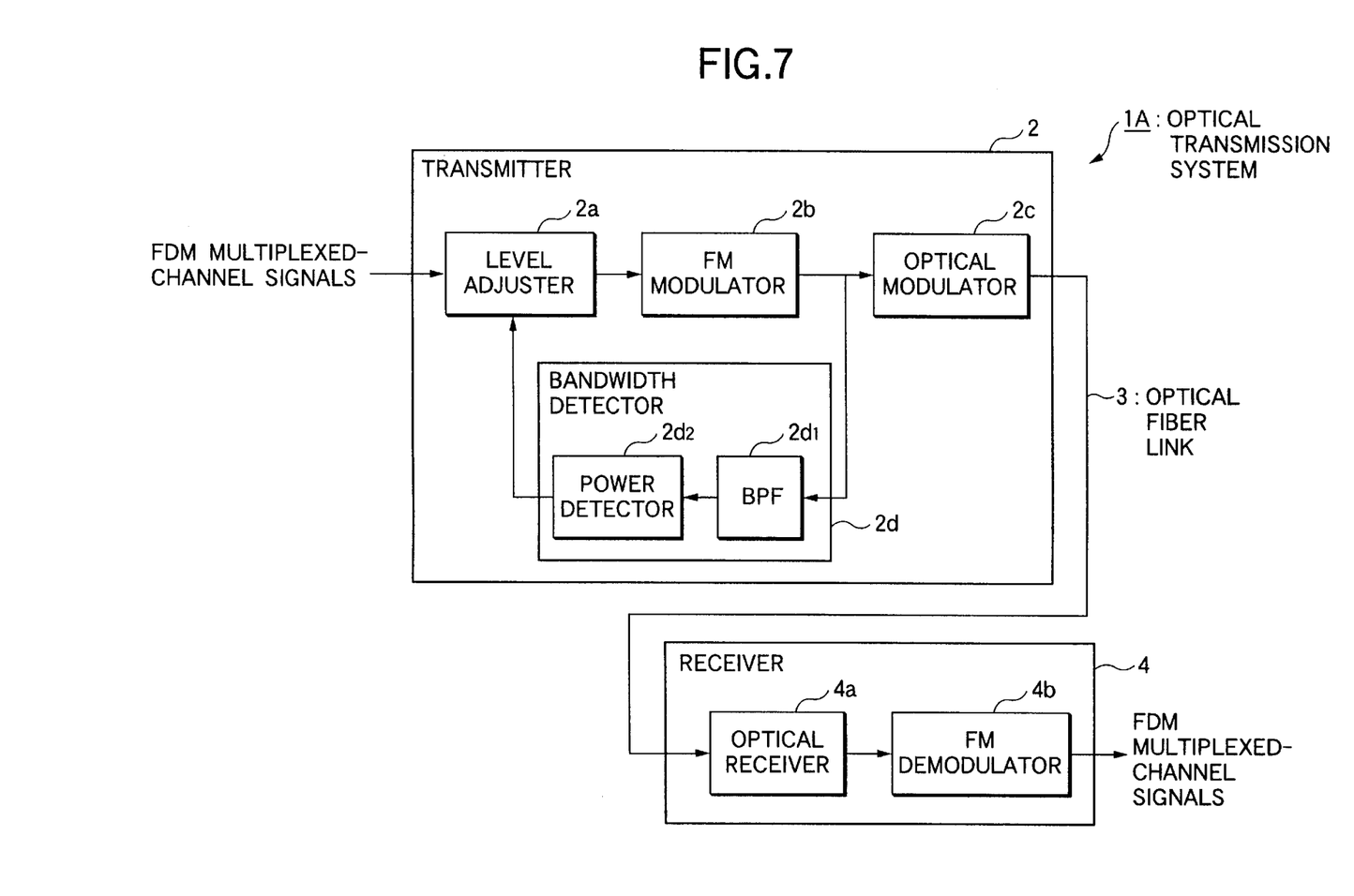
FIG. 7 is a block diagram showing the configuration of a variation in embodiment 2 of the invention.

FIG. 7 is a block diagram showing the configuration of a variation in embodiment 2 of the invention. Same signs are used for the same configuration as that of embodiment 1, and corresponding details are omitted. In this variation, the bandwidth detector 2d in embodiment 2 is composed of a bandpass filter (BPF) $2d_1$ and a power detector $2d_2$. Accordingly, it is possible to automatically adjust the input level of FDM multiplexed-channel signals input to the FM modulator 2b to keep constant the bandwidth of FM signal through the level adjuster 2a, based on control signals from the bandwidth detector 2d.

Figure 8:
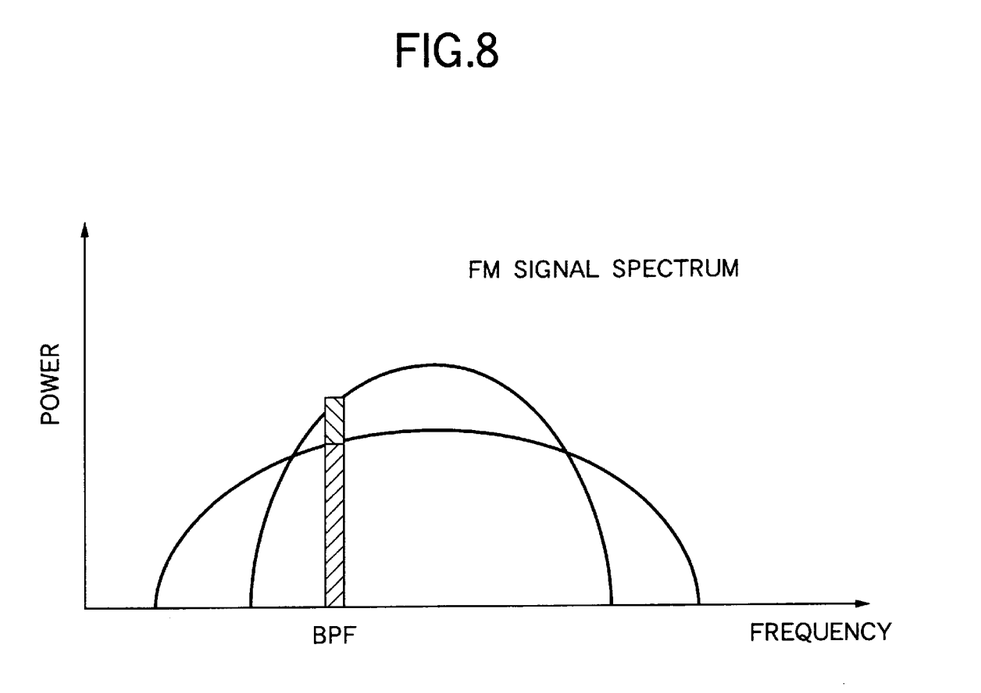
FIG. 8 is a diagram showing the method for detecting the bandwidth of FM signal.

FIG. 8 shows FM signal spectrum, the horizontal axis representing frequencies and vertical axis power. The bandwidth detector 2d of FIG. 7 extracts part of FM signal shown in FIG. 8 through the BPF $2d_1$, detects the corresponding power through the power detector $2d_2$, then detects the bandwidth of FM signals, based on the fact that the power level is associated with the spread of FM signals. The resulting FM signal frequency modulated as a single unit is applied to the optical modulator 2c and the signal light is intensity modulated for optical signal transmission through the optical fiber 3. Optical signals transmitted to the receiver 4 undergo photoelectric conversion by the optical receiver 4a, and the FM signal frequency modulated as a single unit are obtained. The resulting FM signal frequency modulated as a single unit is frequency demodulated by the FM demodulator 4b to restore FDM multiplexed-channel signals.

As mentioned earlier, according to a variation of this embodiment, the bandwidth of FM signals can be detected through the bandwidth detector 2d simply composed of the BPF $2d_1$ and the power detector $2d_2$, even in the case where the number of channels of FDM multiplexed-channel signals input to the transmitter 2 is small, and the bandwidth of FM signals frequency modulated as a single unit is reduced, or in the case where the number of transmission channels has changed after system implementation. Accordingly, it is possible to automatically increase the signal level per waveform of FDM multiplexed-channel signals through the level adjuster 2a. Moreover, it is possible to reduce and keep substantially constant the distortion caused by a ripple-shaped group delay deviation on the FM signal channel in a transmitter or a receiver by keeping constant the bandwidth of FM signal.

Figure 9:
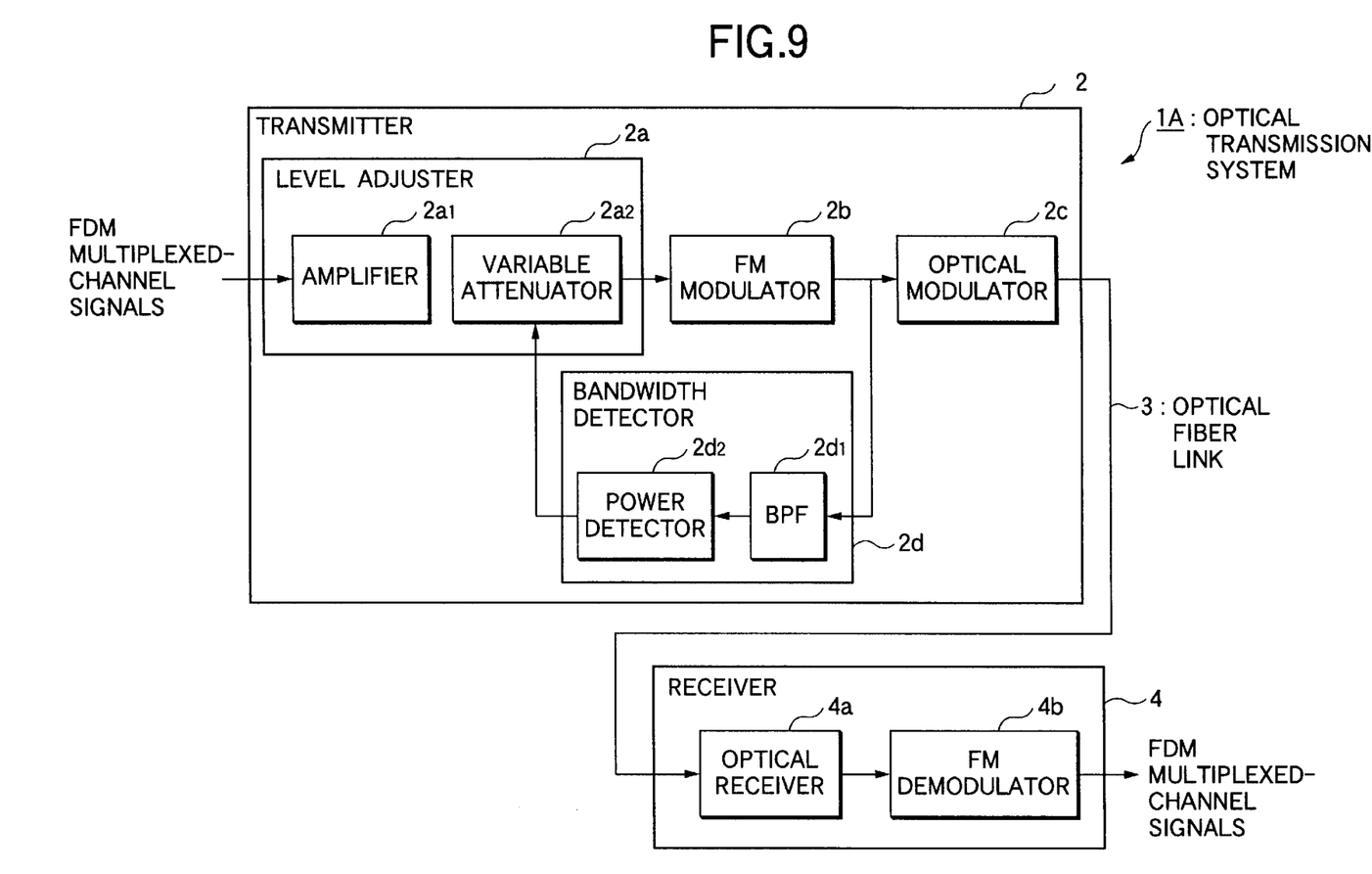
FIG. 9 is a block diagram showing the configuration of embodiment 3 according to the invention.

FIG. 9 is a block diagram showing the configuration of embodiment 3 according to the invention. Same signs are used for the same configuration as that of embodiments 1 and 2, and corresponding details are details are omitted.

In embodiment 3 of the invention, the level adjuster 2a is composed of an amplifier $2a_1$ and a variable attenuator $2a_2$ and the bandwidth detector 2d is composed of a BPF $2d_1$ and a power detector $2d_2$. That is, the transmitter 2 is composed of a combination of the configuration of the level adjuster 2a shown in FIG. 2 and the configuration of the bandwidth detector 2d shown in FIG. 7. Accordingly, FDM multiplexed-channel signals input to the transmitter 2 are automatically adjusted in terms of the input level to the FM modulator 2b, so that the bandwidth of FM signal can be kept constant through the variable attenuator $2a_1$ of the level adjuster 2a based on control signals from the bandwidth detector 2d. The level-adjusted FDM multiplexed-channel signals are frequency modulated as a single unit by the FM modulator 2b. As mentioned with reference to FIG. 8, the bandwidth detector 2d extracts part of FM signals through the BPF $2d_1$, detects the corresponding power through the power detector $2d_2$, then detects the bandwidth of FM signals, based on the fact that the power level is associated with the spread of FM signals.

As mentioned earlier, according to embodiment 3 of the invention, the bandwidth of FM signal can be detected through the bandwidth detector 2d simply composed of the BPF $2d_1$ and the power detector $2d_2$, even in the case where the number of channels of FDM multiplexed-channel signals input to the transmitter 2 is small, and the bandwidth of FM signal frequency modulated as a single unit is reduced, or in the case where the number of transmission channels has changed after system implementation. Accordingly, it is possible to automatically increase the signal level per waveform of FDM multiplexed-channel signals through the level adjuster 2a simply composed of the amplifier $2a_1$ and the variable attenuator $2a_2$. Thus it is possible to reduce and keep substantially constant the distortion caused by a ripple-shaped group delay deviation on the FM signal channel in a transmitter or a receiver and receiver 4 by keeping constant the bandwidth of FM signal.

In the embodiments of the invention, an exemplary level adjuster 2a is composed of an amplifier $2a_1$ and a variable attenuator $2a_2$ and an exemplary bandwidth detector 2d is composed of a BPF $2d_1$ and a power detector $2d_2$. These embodiments do not limit a level adjuster 2a or a bandwidth detector 2d which may fall within the scope and spirit of the invention.

As mentioned earlier, according to the optical transmission system of the invention, advantages are obtained that the bandwidth of FM signal can be enlarged and the distortion caused by a ripple-shaped group delay deviation of a transmitter, a receiver and an optical link can be reduced by adjusting to increase the level per waveform of FDM multiplexed-channel signals through signal level adjusting means, even in the case where the number of channels of FDM multiplexed-channel signals input to the transmitter is small, and the bandwidth of FM signal frequency modulated as a single unit is reduced.

According to the optical transmission system of the invention, advantages are obtained that the bandwidth of FM signal can be enlarged and the distortion caused by a ripple-shaped group delay deviation of signals transmitted can be reduced to transmit FDM multiplexed-channel signals with good signal quality, by increasing the level per waveform of FDM multiplexed-channel signals, even in the case where the number of channels of FDM multiplexed-channel signals input to the transmitter is small, and the bandwidth of FM signal frequency modulated as a single unit is reduced.

What is claimed is:

1. An optical transmission system comprising:
   a transmitter for transmitting optical signals based on frequency-division-multiplexed (FDM) multiplexed-channel input signals that have been multiplexed using frequency-division-multiplexing; and
   a receiver for receiving said optical signals transmitted from said transmitter through optical transmission means, wherein
   said transmitter having a signal level adjusting section for reducing a ripple-shaped distortion caused by a group delay deviation from at least one of said transmitter, said receiver, and said optical transmission means when-said said signal level adjusting section adjusting signal levels of transmitted signals to be constant in accordance with the number of channels of said multiplexed-channel input signals.

2. An optical transmission system according to claim 1, wherein
   said transmitter is comprised of a FM modulator for performing frequency modulation to said multiplexed-channel input signals that are provided to the FM modulator in a single stream, and an optical modulator for sending said optical signals to said receiver through said optical transmission means wherein said optical signals are based on frequency-modulated (FM) signals from said FM modulator that have adjusted intensity, and further wherein
   said receiver is comprised of a FM demodulator for performing frequency demodulations.

3. An optical transmission system according to claim 1, wherein said signal level adjusting section is comprised of an amplifier for amplifying said FDM multiplexed-channel signals and an attenuator for variably attenuating output signals of said amplifier.

4. An optical transmission system according to claims 1 or 3, wherein said signal level adjusting section is manually adjustable to adjust the signal levels of said multiplexed-channel input signals in accordance with the numbers of channels of said multiplexed-channel input signals.

5. An optical transmission system according to claim 2, wherein said transmitter is further comprised of a bandwidth detector for detecting bandwidth of said FM signals.

6. A transmitter used for an optical transmission system comprising:
   a transmitter for transmitting optical signals to a receiver based on multiplexed-channel input signals that have been multiplexed using frequency-division-multiplexing (FDM), wherein said transmitter has a signal level adjusting means for reducing a ripple-shaped distortion caused by a group delay deviation from in at least one of said transmitter, said receiver, and an optical transmission means between said transmitter and said receiver, said signal level adjusting section adjusting signal levels of transmitted signals to be constant in accordance with the number of channels of said multiplexed-channel input signals.

7. An optical transmitter used for an optical transmission system according to claim 6, wherein said transmitter is comprised of a FM modulator for performing frequency modulation to said multiplexed-channel input signals that are provided to the FM modulator in into a single stream.

8. An optical transmitter used for an optical transmission system according to claim 6, wherein the signal level adjusting means is comprised of an amplifier for amplifying said FDM multiplexed-channel signals and an attenuator for variably attenuating output signals of said amplifier.

9. An optical transmitter used for an optical transmission system according to claim 6, wherein said signal level adjusting means is manually adjustable to adjust the signal levels of said multiplexed-channel signals in accordance with the numbers of channels of said multiplexed-channel input signals.

10. An optical transmitter used for an optical transmission system according to claim 6, wherein said transmitter is further comprised of a bandwidth detector for detecting bandwidth of said FM signals.

\* \* \* \* \*

UNITED STATES PATENT AND TRADEMARK OFFICE
CERTIFICATE OF CORRECTION

PATENT NO. : 6,748,173 B2  Page 1 of 1
DATED : June 8, 2004
INVENTOR(S) : Yoshikazu Ishii et al.

It is certified that error appears in the above-identified patent and that said Letters Patent is hereby corrected as shown below:

Column 9,
Line 51, please delete "when-said".

Signed and Sealed this

Seventh Day of September, 2004

JON W. DUDAS
*Director of the United States Patent and Trademark Office*